No. 680,633. Patented Aug. 13, 1901.
D. J. C. ARNOLD.
METAL WHEEL.
(Application filed Dec. 8, 1900.)
(No Model.)
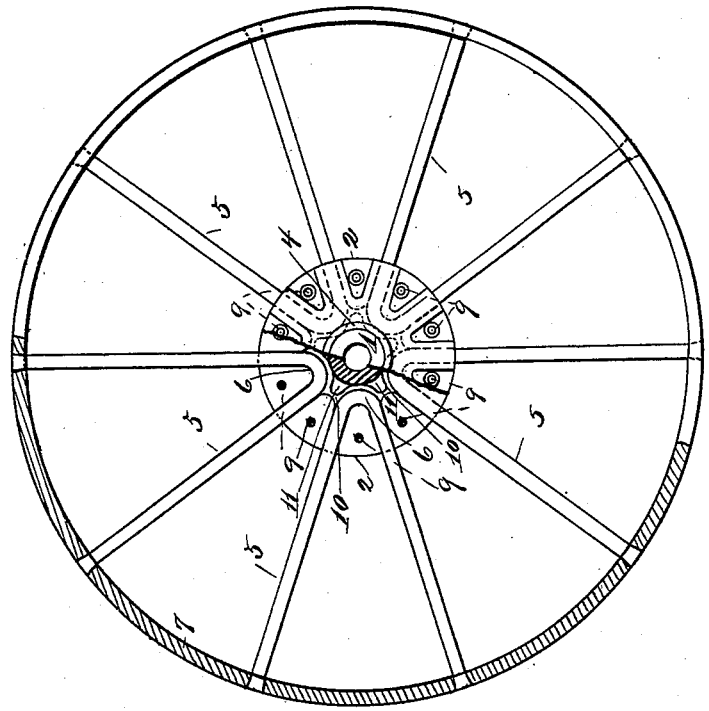
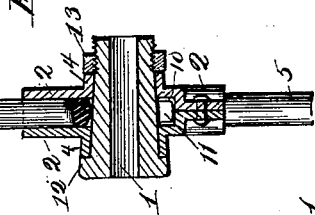 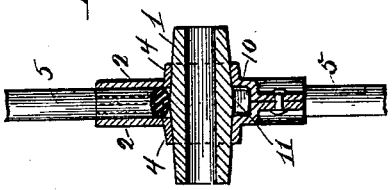
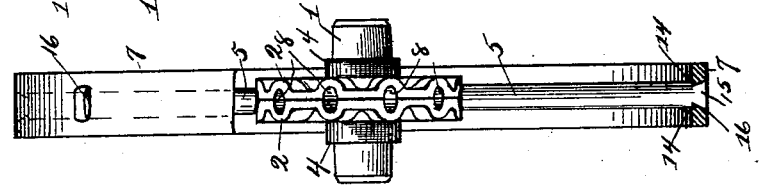
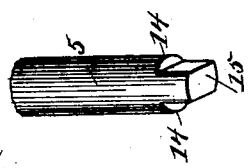
Witnesses
Inventor
Daniel J. C. Arnold
by Wm. M. Monroe
Attorney

UNITED STATES PATENT OFFICE.

DANIEL J. C. ARNOLD, OF NEW LONDON, OHIO.

METAL WHEEL.

SPECIFICATION forming part of Letters Patent No. 680,633, dated August 13, 1901.

Application filed December 8, 1900. Serial No. 39,241. (No model.)

*To all whom it may concern:*

Be it known that I, DANIEL J. C. ARNOLD, a citizen of the United States, and a resident of New London, county of Huron, State of Ohio, have invented certain new and useful Improvements in Metal Wheels, of which I hereby declare the following to be a full, clear, and exact description, such as will enable others skilled in the art to which it appertains to make and use the same.

My invention relates to improvements in metal wheels, and has especial reference to the construction of a wheel comprising a composite metal hub and metal spokes and rim; and it consists in the combination and arrangement of the various parts and construction of details, as hereinafter described, shown in the accompanying drawings, and specifically pointed out in the claims.

In the accompanying drawings, Figure 1 is a face view of the wheel, a portion being cut away to show the arrangement of the spokes therein. Fig. 2 is an edge view of the wheel, a portion of the rim being cut away to show the hub. Figs. 3 and 4 are longitudinal sections of the hub, showing two ways of securing the hub portions together; and Fig. 5 is a view of the outer extremity of a spoke before riveting.

In the accompanying drawings, 1 is the inner hub, formed of cast metal.

2 represents sheet-metal disks sleeved over the hub and placed face to face, so that the flanges 4 thereon project on either side and form a firm bearing for them.

The spokes 5 are arranged in pairs, each pair being formed of one integral rod bent centrally to form an angle at 6 and secured at the outer extremities in a rim 7. The angular portion of each rod is placed between the disks and inclosed in recesses 8, formed therein, the sheet metal being so corrugated as to provide the required openings to receive the rod. Rivets 9 are then employed to compress the spokes between the disks, and thus secure all parts tightly together. The depressions 10 between each pair of spokes are filled by the projecting lugs 11, which are integral with the metal portion of the hub 1. These lugs engage the disks and serve to communicate a positive movement from the hub thereto, and thus obviate any possibility of the disks slipping on the central portion.

In Figs. 3 and 4 are shown two methods of attaching the disks to the central portion of the hub. In Fig. 3 a central portion is shown provided with a taper toward one end and a shoulder 12 at the other. The smaller extremity is threaded to receive a nut 13. The disks are provided with reversely-tapered flanges, and after the spokes are attached and the disks riveted together the central hub can be slipped in, and by means of the nut the flanges are forced upon it until the flange next adjacent to the shoulder abuts tightly against it. In Fig. 4 is seen a simpler form, in which the central hub is tapered from the center toward each end, and the disks are placed separately thereon from each end and secured afterward by means of rivets. It will be seen that the double taper of the hub effectually prevents the disks from slipping in either direction.

The spokes are formed of rods of oval section, and the extremities are reduced by means of a die chamfering off the corners and leaving a shoulder 14 on either side of a central tongue 15, which is the full width of the rod in its narrowest dimension. This tongue is then inserted into a countersunk taper opening 16 in the rim and upset, so as to form a rivet at the extremity of the spoke. The advantage of this form of construction of spoke is seen in the ease with which it can be riveted on the riveting-machine, the shoulders forming a foundation against which the hammer can work.

Having described my invention, what I claim as new, and desire to secure by Letters Patent, is—

1. The combination with a central tapered cast-metal hub provided with lugs upon its periphery, of sheet-metal disks sleeved thereon, and provided with annular flanges arranged to bear upon the central portion, radially-arranged recesses in the meeting faces of the flanges, spokes secured in said recesses, and recesses in which said lugs are inclosed, substantially as described.

2. The combination with a central cast-metal hub portion, of sheet-metal disks sleeved thereon, spokes arranged in pairs and each pair consisting of a continuous bent rod, secured between said disks, recesses in the meeting faces of said disks in which said pairs of spokes are inclosed at their inner ends, flanges upon said disks arranged to engage said central hub, lugs upon the central hub inclosed in said recesses in said disks, and means for securing the disks together, and to the central hub, substantially as described.

3. In a metal wheel, the combination with a central cast-metal hub, of a detachable sheet-metal hub, comprising sheet-metal disks provided with flanges and sleeved upon the central hub, spokes arranged in pairs, each pair consisting of one integral rod of oval section centrally bent, and inclosed between said disks at the point of bending, lugs upon the central hub engaging said disks, and a metal rim in which the extremities of the spokes are riveted, the said spoke extremities being reduced in one direction and the openings in the rim being countersunk to receive them.

In testimony whereof I have signed my name to this specification in the presence of two subscribing witnesses.

DANIEL J. C. ARNOLD.

Witnesses:
E. M. PALMER,
VERN V. KETCHUM.